(12) United States Patent
Bieleń et al.

(10) Patent No.: US 10,811,948 B2
(45) Date of Patent: Oct. 20, 2020

(54) SYSTEM AND METHOD FOR CALIBRATING AN AIR GAP IN A SERVOVALVE TORQUE MOTOR

(71) Applicant: Hamilton Sundstrand Corporation, Charlotte, NC (US)

(72) Inventors: Michał Bieleń, Syców (PL); Mariusz Malik, Chrzastawa Wielka (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 102 days.

(21) Appl. No.: 16/105,452

(22) Filed: Aug. 20, 2018

(65) Prior Publication Data
US 2019/0123627 A1    Apr. 25, 2019

(30) Foreign Application Priority Data
Oct. 19, 2017    (EP) .................... 17461623

(51) Int. Cl.
| H02K 26/00 | (2006.01) |
| F16K 31/04 | (2006.01) |
| H01F 7/14 | (2006.01) |

(52) U.S. Cl.
CPC ............ *H02K 26/00* (2013.01); *F16K 31/04* (2013.01); *H01F 7/14* (2013.01); *H02K 2201/03* (2013.01); *H02K 2213/09* (2013.01)

(58) Field of Classification Search
CPC .. F15B 19/002; H02K 26/00; H02K 2213/09; H02K 2201/03; H01F 7/14; H01F 7/121; F16K 31/042; F16K 31/02; F16K 31/04
USPC ................. 310/36, 254.1, 209, 191
See application file for complete search history.

(56) References Cited

U.S. PATENT DOCUMENTS

| 3,434,083 | A | | 3/1969 | Lewis | |
| 3,435,393 | A | * | 3/1969 | Meisel | ...................... H01F 7/14 |
| | | | | | 335/237 |
| 3,555,321 | A | * | 1/1971 | Gruener | ................... B41J 19/02 |
| | | | | | 310/93 |
| 4,017,706 | A | | 4/1977 | Aubrecht et al. | |
| 5,473,209 | A | * | 12/1995 | Lamb | ................... H02K 49/046 |
| | | | | | 310/75 D |
| 5,473,298 | A | | 12/1995 | Teutsch | |

(Continued)

FOREIGN PATENT DOCUMENTS

| CN | 106640804 A | 5/2017 |
| CN | 206309696 U | 7/2017 |
| EP | 0727868 A1 | 8/1996 |

OTHER PUBLICATIONS

Extended European Search Report for International Application No. 17461623.5 dated Apr. 16, 2018, 7 pages.

*Primary Examiner* — Burton S Mullins
(74) *Attorney, Agent, or Firm* — Cantor Colburn LLP

(57) ABSTRACT

A torque motor for a servovalve, said torque motor comprising a set of pole pieces comprising a first pole piece and a second pole piece. An armature is also provided between the first pole piece and the second pole piece, said armature configured to provide air gaps (AG1-AG4) between the armature and the first pole piece, and the armature and the second pole piece. The armature is configured to rotate about a centre point (CP). The set of pole pieces is also adapted to rotate around the centre point (CP) such that the air gaps (AG1-AG4) can be adjusted.

14 Claims, 7 Drawing Sheets

(56) References Cited

U.S. PATENT DOCUMENTS

| | | | | |
|---|---|---|---|---|
| 5,679,989 | A * | 10/1997 | Buscher | H02K 26/00 |
| | | | | 29/596 |
| 6,344,702 | B1 | 2/2002 | Rodriguez et al. | |
| 7,969,055 | B2 * | 6/2011 | Titus | H02K 53/00 |
| | | | | 310/152 |
| 9,018,821 | B2 * | 4/2015 | Stiesdal | H02K 1/182 |
| | | | | 290/55 |
| 10,069,353 | B2 * | 9/2018 | de la Chevasnerie | ........................ |
| | | | | F15B 13/0436 |
| 2007/0052312 | A1 * | 3/2007 | Stanetskiy | H02K 53/00 |
| | | | | 310/152 |
| 2017/0214305 | A1 * | 7/2017 | Tranovich | H02K 15/00 |

* cited by examiner

SYSTEM AND METHOD FOR CALIBRATING AN AIR GAP IN A SERVOVALVE TORQUE MOTOR

FOREIGN PRIORITY

This application claims priority to European Patent Application No. 17461623.5 filed Oct. 19, 2017, the entire contents of which is incorporated herein by reference.

TECHNICAL FIELD

The examples described herein relate to a system and method for calibrating an air gap in a servovalve torque motor.

BACKGROUND OF THE INVENTION

Servovalves (SV) are electrohydraulic/pneumatic systems which include a torque motor that functions as a driver for a second part—e.g. a hydraulic/fuel/pneumatic part. Torque motors comprise many separate parts that are individually manufactured and then later assembled together. However, it is not possible to tailor all of these parts to size relative to each other upon initial manufacture. In order to function correctly, the different parts of the servovalve must therefore be adequately adjusted or calibrated, particularly with respect to the air gap present between the poles and armature/plate and pole pieces. A problem, however, is that it is almost impossible to adjust the parts once assembled.

In many servovalve designs, the armature/plate is mounted on a flexible member using brazing or welding processes. These processes make it difficult to provide precise geometry during manufacturing. For example, these processes undesirably provide an amount of thermal expansion and thermal stress to the components of the servovalve. As a result of this, the surfaces of the armature/plate are poorly aligned with the pole pieces and provide incorrect geometries of air gaps in the servovalve.

Currently, to avoid incorrect geometries of air gaps, the air gaps are cut into the torque motor after assembly using Electrical Discharge Machining (EDM). In other methods, the components are manually bent to provide correct air gap geometry. However, these methods have significant drawbacks. Bending of components is limited to the strength of the elements. EDM degrades magnetic properties of the pole pieces when they are cut, which therefore decreases the valve performance. EDM also increases the risk of debris being present on the pole pieces which causes the magnetic fields to flow randomly.

SUMMARY OF THE INVENTION

In an example, there is provided a torque motor for a servovalve, said torque motor comprising a set of pole pieces comprising a first pole piece and a second pole piece. An armature is also provided between the first pole piece and the second pole piece, said armature configured to provide air gaps between the armature and the first pole piece, and the armature and the second pole piece. The armature is configured to rotate about a center point. The set of pole pieces is also adapted to rotate around the center point such that the air gaps can be adjusted.

Preferably, the air gaps may have a length and a width, and the set of pole pieces may be adapted to rotate around the center point such that the length and/or the width of the air gaps can be adjusted.

Further, the first and second pole pieces may have a C-shaped cross section, and the first and second pole pieces may have a ring shaped section extending in a plane and a first portion extending in a direction perpendicularly away from the plane of the ring shaped section. Preferably, the first and second pole pieces may each have a tapered ring section that tapers from the ring shaped section to an outer surface. Preferably, the outer surface is spherical.

There may also be provided a first supporting part having a socket for receiving the first pole piece and a second supporting part having a socket for receiving the second pole piece. The socket of the first supporting part may include a chamfered portion which is angled to receive the tapered portion of the first pole piece, and the second supporting part may include a chamfered portion which is angled to receive the tapered portion of the second pole piece. Preferably, the chamfered portions are spherical.

Preferably, a shim may be provided between the socket of the first supporting part and the first supporting part to adjust the set of pole pieces in a vertical direction relative to the armature.

There may also be provided screws to maintain the position of the set of pole pieces relative to the armature.

In another example, there is provided a method of adjusting air gaps in a torque motor, said method comprising providing a set of pole pieces having a first pole piece and a second pole piece, providing an armature between the first pole piece and the second pole piece, wherein the air gaps are provided between the armature and the first pole piece, and the armature and the second pole piece. The method also includes adjusting the air gaps by rotating the set of pole pieces relative to the armature about a center of rotation of the armature.

The method may also include adjusting a width and/or a length of the air gaps.

Preferably, the first and second pole pieces may each have a C-shaped cross section. The first and second pole pieces may each have a ring shaped section extending in a plane and a first portion extending in a direction perpendicularly away from the plane of the ring shaped section. Preferably, the first and second pole pieces each have a tapered ring section that tapers from the ring shaped section to an outer surface. The outer surface may be spherical.

The method may also include providing a first supporting part having a socket for receiving the first pole piece and a second supporting part having a socket for receiving the second pole piece, and wherein the socket of the first supporting part may include a chamfered portion which is angled to receive the tapered portion of the first pole piece, and wherein the second supporting part may include a chamfered portion which is angled to receive the tapered portion of the second pole piece. Preferably, the chamfered portions are spherical.

The method may also include providing a shim between the socket of the first supporting part and the first supporting part to adjust the set of pole pieces in a vertical direction relative to the armature.

The method may further include fixing the position of the set of pole pieces relative to the armature.

DETAILED DESCRIPTION OF THE INVENTION

Generally, a torque motor is described. The torque motor of the examples set forth below includes pole pieces that are able to move in order to calibrate the air gaps of the torque motor.

Figure 1:
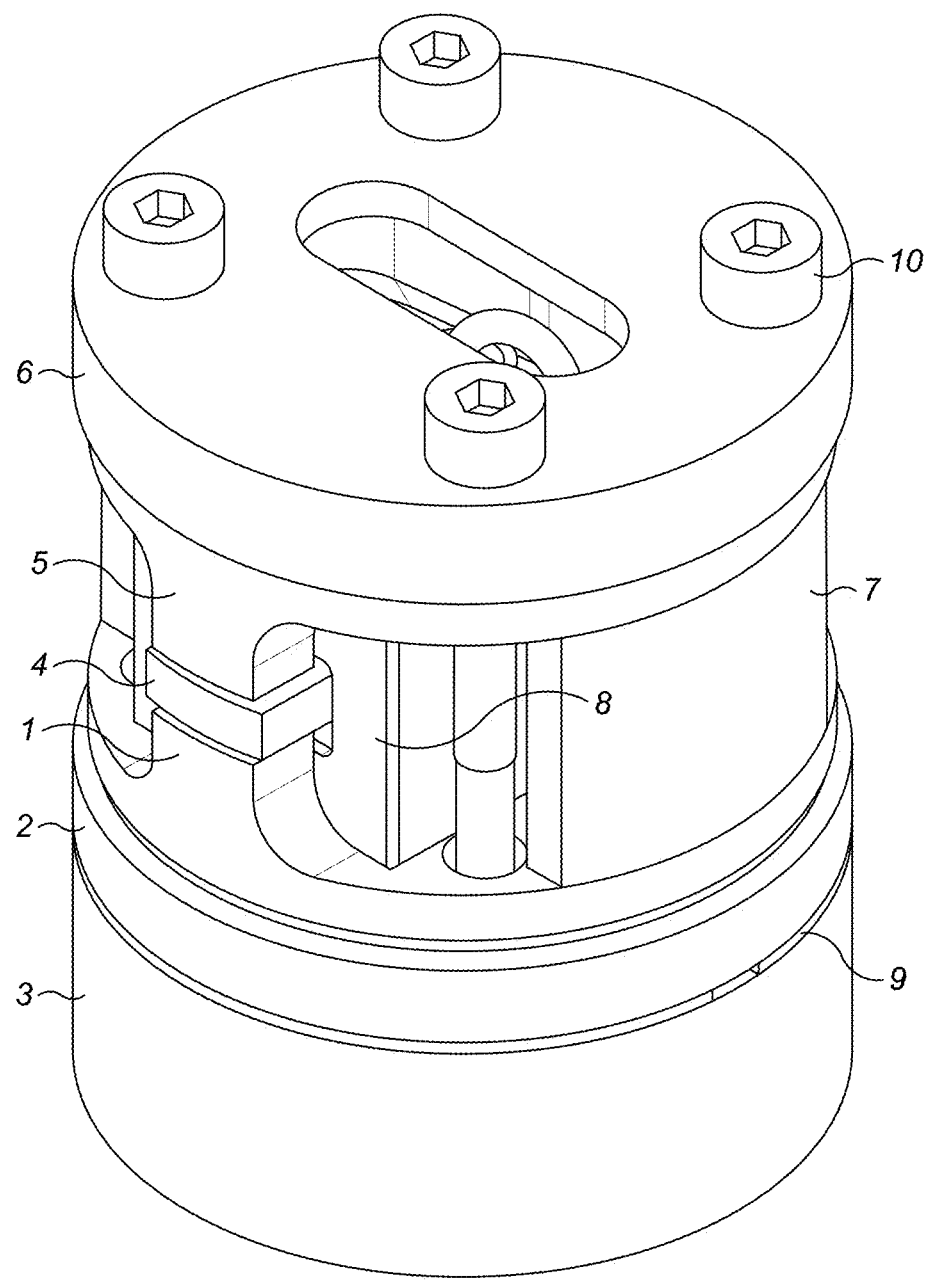
FIG. 1 shows an assembled torque motor.

FIG. 1 depicts a torque motor 100 having various components assembled. The torque motor 100 comprises a first pole piece 1, a second pole piece 5, a first supporting part 3 having a socket 2 for receiving the first pole piece 1, a second supporting part 6 having a socket (not shown) for receiving the second pole piece 5, an armature 6, a set of magnets 7 and a set of coils 8, wherein the set of magnets 7 and the set of coils 8 can move the armature 4 and the pole pieces 1 and 5. The second supporting part 6 may also be adjusted and tightened on to the second pole piece 5 by using screws 10 to therefore fix the first and second pole pieces 1 and 5 in place to calibrate/adjust the air gaps, as described in more detail below.

Figure 2:
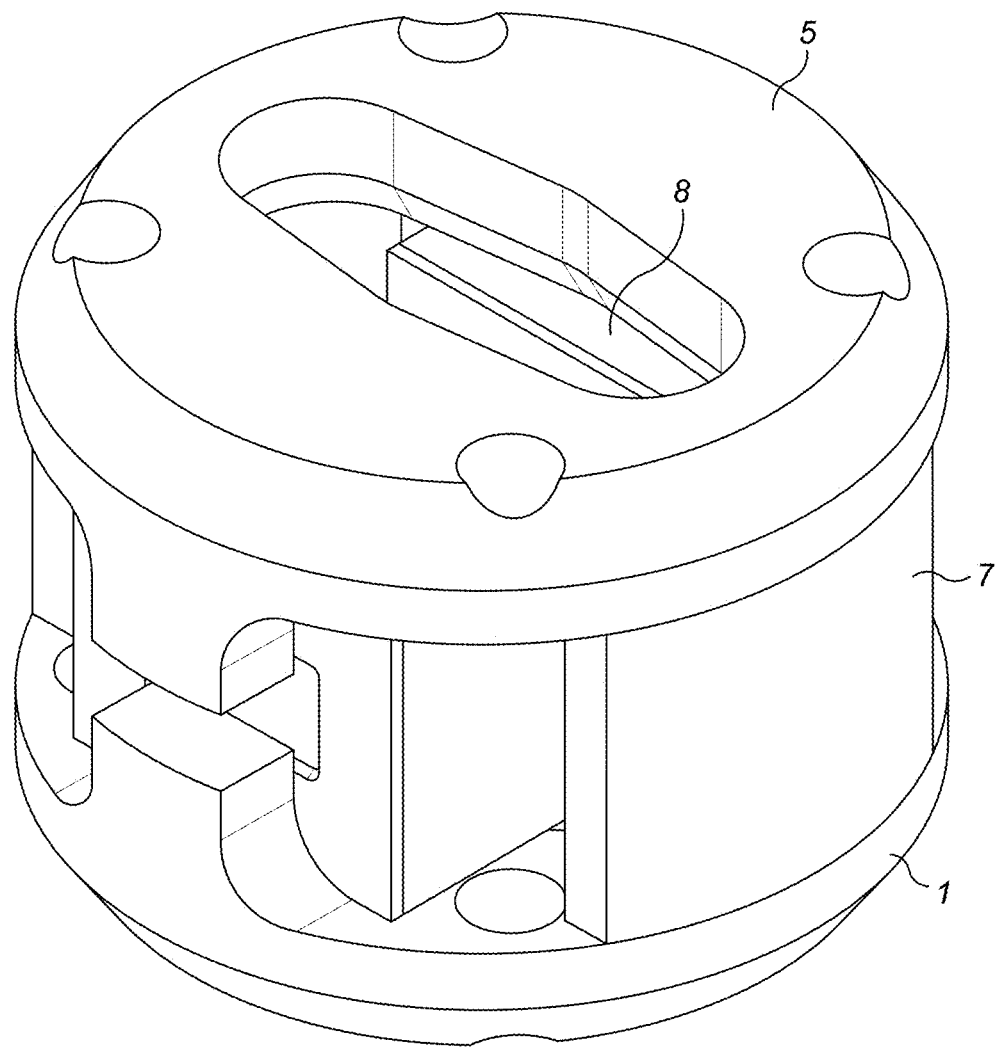
FIG. 2 shows a set of pole pieces used in the torque motor of FIG. 1.

FIG. 2 shows the first and second pole pieces 1 and 5 as a set 11. The set 11 also includes the set of magnets 7 and set of coils 8 that may move the armature (not shown) and the first and second pole pieces 1 and 5.

Figure 3:
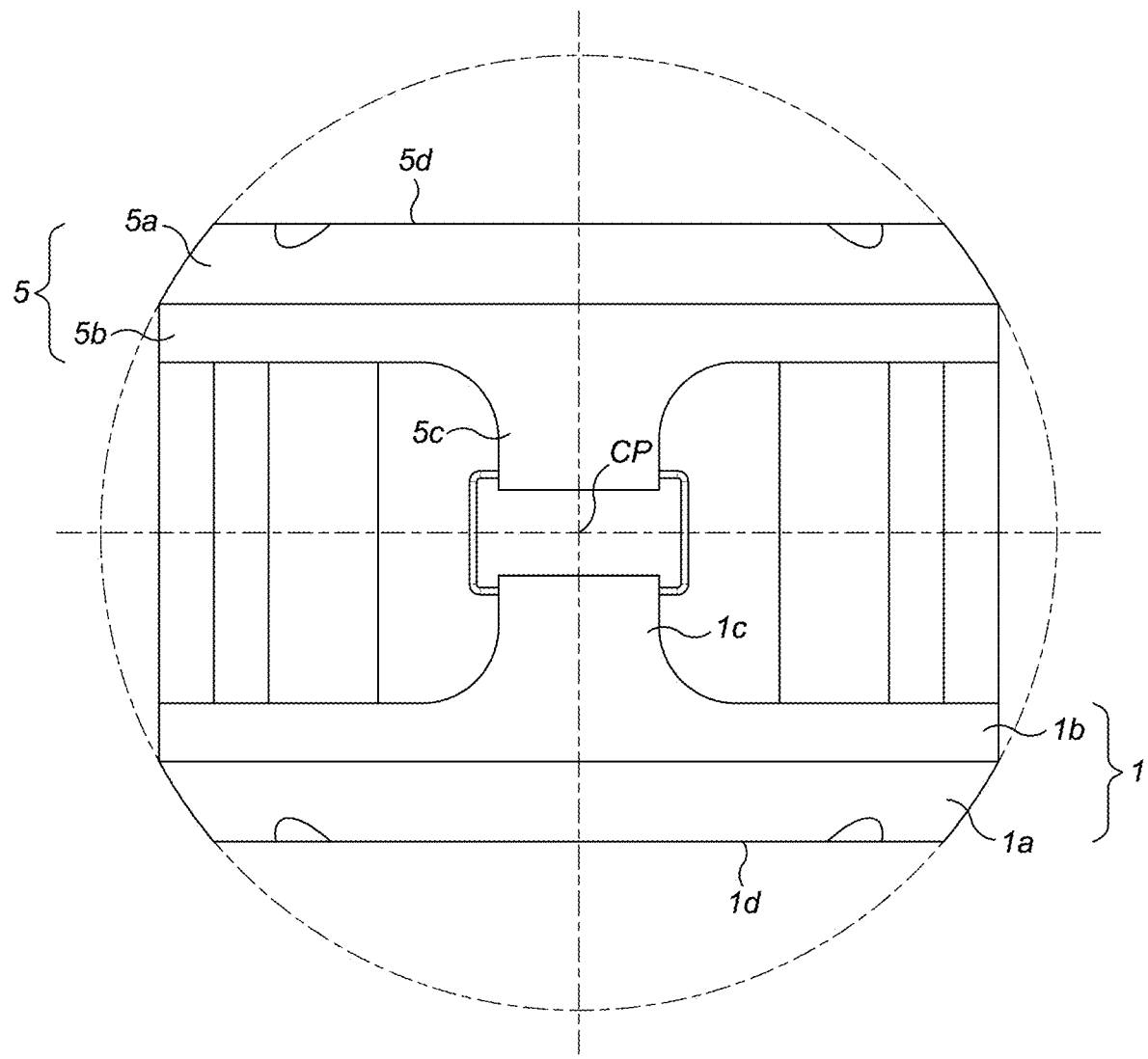
FIG. 3 shows the set of pole pieces of FIG. 2.

FIG. 3 shows the axial geometry of the first and second pole pieces 1 and 5. The pole pieces 1 and 5 each have a "C-shaped" cross section (seen clearly in FIG. 4).

Each pole piece 1 and 5 has a ring shaped section 1b, 5b extending in a first plane and a first portion 1c, 5c extending in a direction perpendicularly away from the plane of the ring shaped section 1b, 5b. Adjacent the ring shaped section 1b, 5b, and on the opposite side of the portion 1c, 5c, there is provided a tapered ring section 1a, 5a which tapers from the ring shaped section 1b, 5b to a surface 1d, 5d (i.e., an outer surface) of the pole pieces 1 and 5. Upon assembly, the first and second pole pieces 1 and 5 are positioned so that the perpendicularly extending portions 1c, 5c face each other and also face the armature 4 (not shown in FIG. 3) which is positioned there between.

As can be seen in FIG. 3, the tapered portions 1a, 5a may preferably be spherical and rotate in a spherical area (shown in FIG. 3 as a circular axis around the pole pieces 1 and 5). It follows therefore that the outer surfaces 1d and 5d are also spherical. The midpoint of the spherical area is the center point (CP) on which the armature 4 (not shown in FIG. 3) rotates. It is envisaged that the pole pieces 1 and 5 may rotate in this spherical area in any direction, but preferably the pole pieces 1 and 5 move in the same axis of rotation as the armature. Although in the example shown in FIG. 3, the tapered portions 1a and 5a are spherical, it is possible that the outer surface may be straight at the taper.

Figure 4:
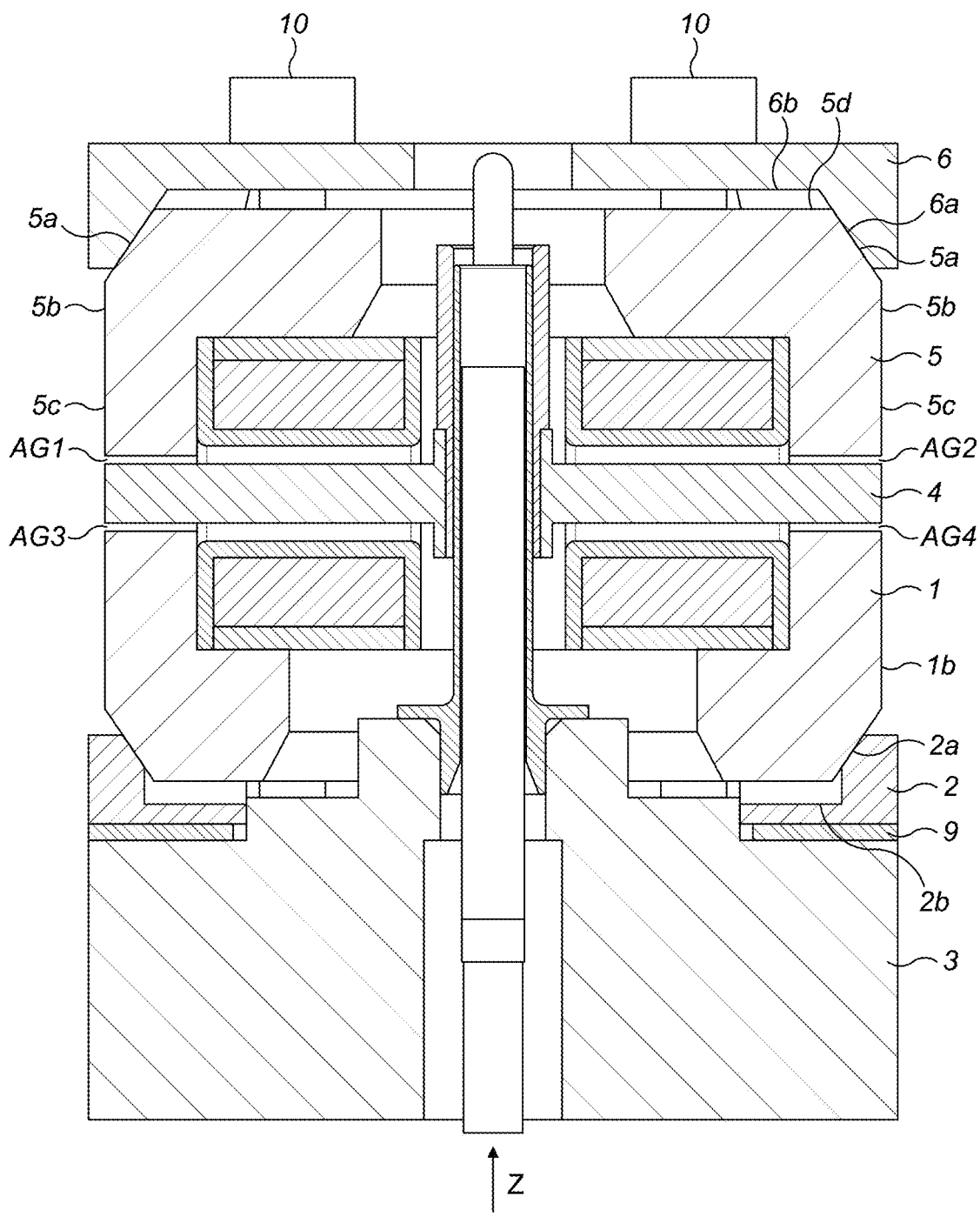
FIG. 4 shows a cross section of the assembled torque motor of FIG. 1.

FIG. 4 shows a cross section of the torque motor 100 assembled with the various components described above. The pole pieces 1 and 5 are shown in this Figure as "C shaped" sections where the perpendicularly extending portions 1c, 5c are facing each other with the armature 4 there between. FIG. 4 shows air gaps AG1, AG2, AG3 and AG4 between the armature 4 and the perpendicularly extending portions 1c and 5c of the pole pieces 1 and 5.

Also shown in FIG. 4 are the first and second supporting parts 3 and 6 for supporting the pole pieces 1 and 5. Supporting part 3 includes a socket portion 2 for receiving the tapered portion 1a of the first pole piece 1. There is therefore provided a recess 2b within the socket 2. The socket 2 also includes a chamfered portion 2a which is angled to receive the tapered portion 1a of the first pole piece 1. In a preferred example, the chamfered portion 2a is also spherical to receive the tapered portion 1a of the first pole piece.

Supporting part 6 is positioned to receive the second pole piece 5. Supporting part 6 includes a chamfered portion 6a to receive the tapered portion 5a of the second pole piece 5. In a preferred example, the chamfered portion 6a is spherical to receive the tapered portion 5a. The chamfered portion 6a of supporting part 6 leads to a recess 6b for receiving the second pole piece 5. The supporting part 6 may be removed, added, loosened or tightened by using screws 10. The supporting part 6 therefore supports the second pole piece 5 when it is in the desirable position, as described below.

FIG. 4 also shows a shim 9 which may be added between the socket portion 2 and supporting part 3 for adjusting the first pole piece 1 in a vertical direction—i.e., towards the armature for calibration of air gaps AG3 and AG4. In the example shown, there is provided one shim 9 for adjusting the pole piece 1. However, it is envisaged that one or more shims may be used as necessary.

Figure 5:
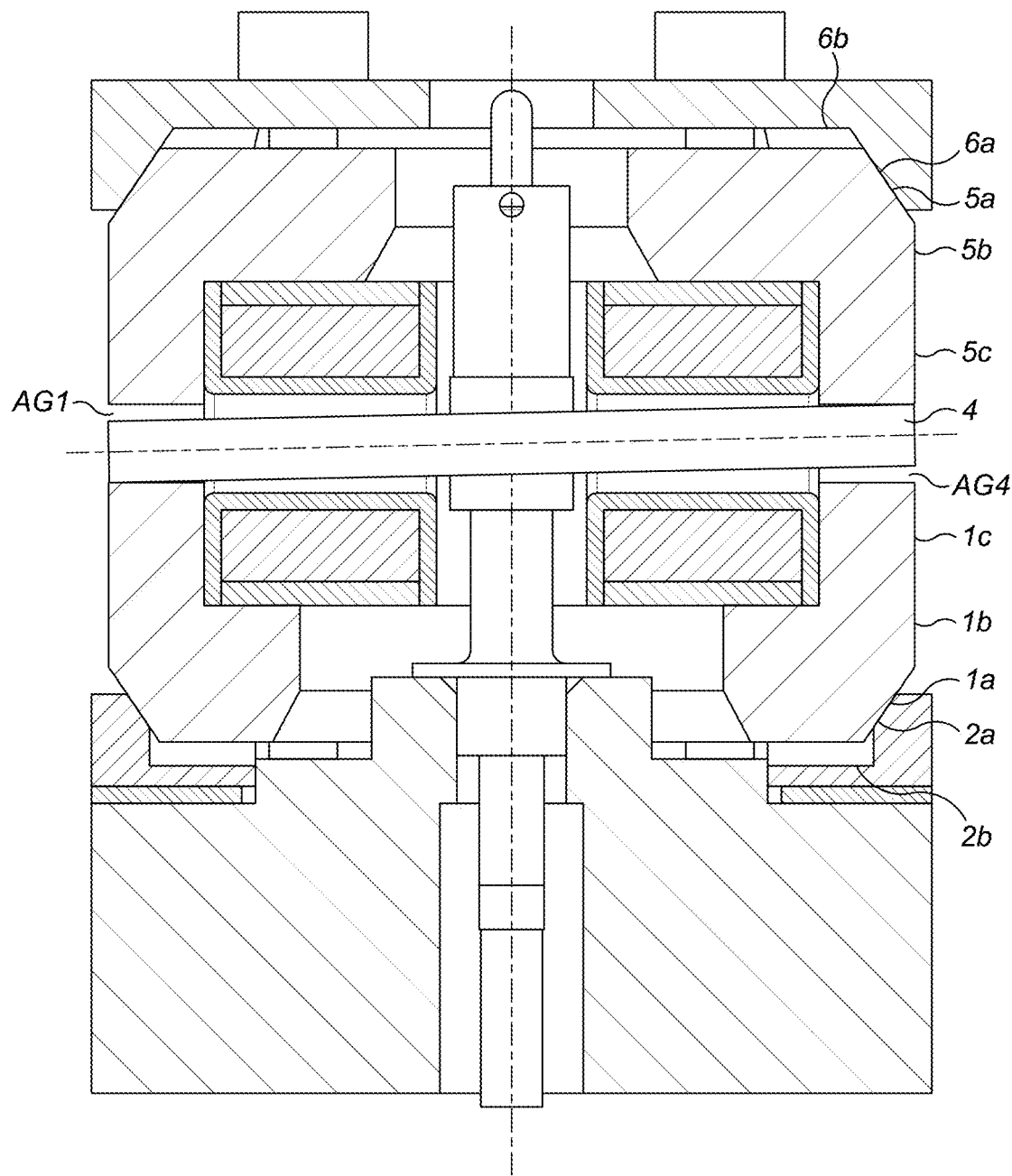
FIG. 5 shows a cross section of the assembled torque motor of FIG. 1 with a positioned armature.

FIG. 5 shows a cross section of the torque motor assembly when the armature 4 is in an undesired position. As can be seen here, the armature 4 has moved to close air gaps AG2 and AG3. Air gaps AG1 and AG4 are therefore larger. The armature 4 has biased towards opposing perpendicular extending portions 5c and 1c of the pole pieces.

Figure 6:
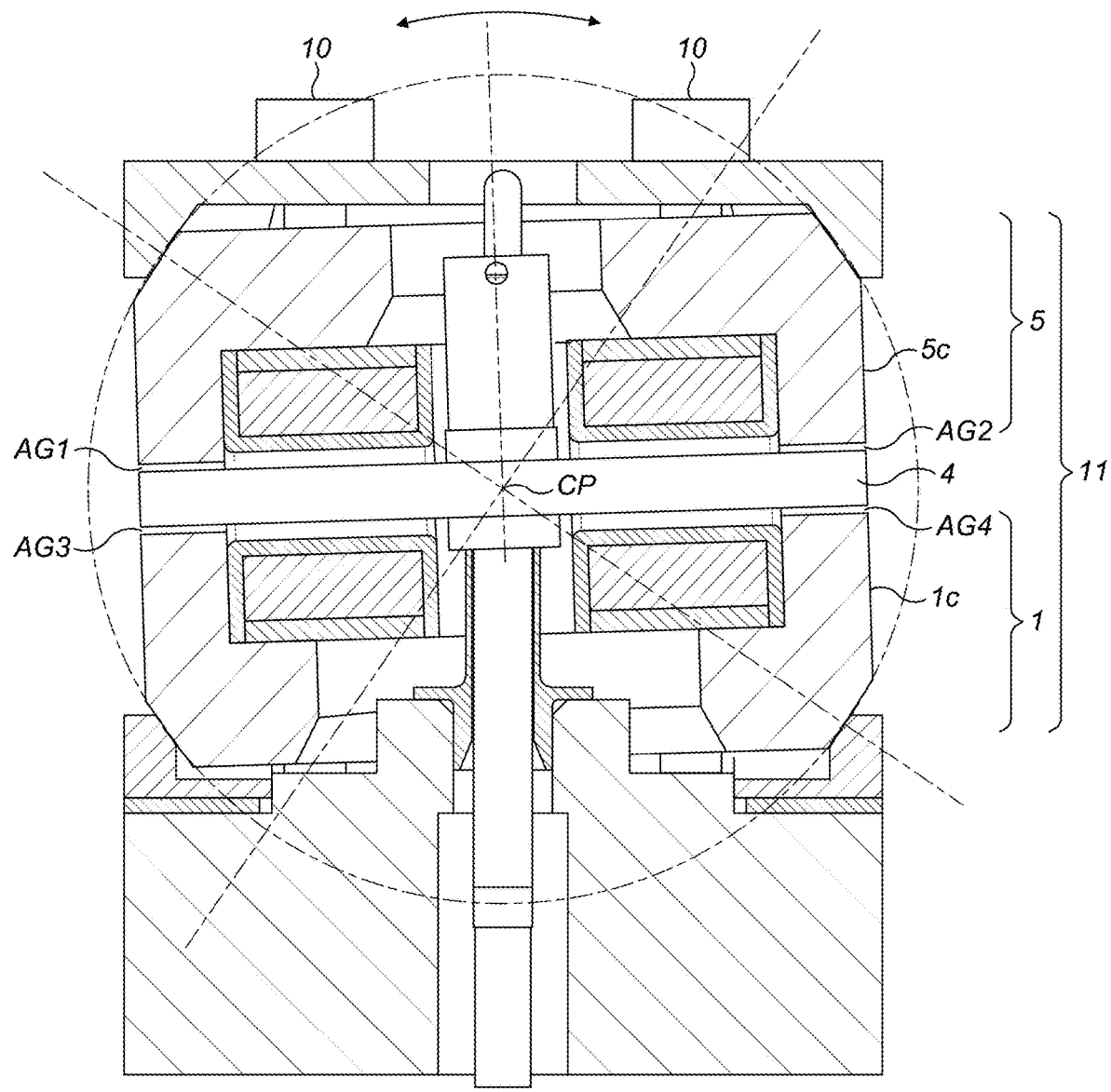
FIG. 6 shows a cross section of the assembled torque motor of FIG. 1 with a positioned armature and the calibrated pole pieces.

To alleviate the undesired effects of FIG. 5, a set of pole pieces 11 that includes the pole pieces 1 and 5 is moved within the first supporting part 3 and second supporting part 6 to adjust the air gaps AG1-AG4, as shown in FIG. 6. As can be seen in FIG. 6, the set of pole pieces 11 is rotated about the center point (CP) to adjust the air gaps AG1-AG4 to the desired value. FIG. 6 shows that the perpendicularly extending portions 1c and 5c are now parallel with the armature 4 to provide the air gaps AG1-AG4. In this example, the set of pole pieces 11 rotates around the center point CP from left to right, or vice versa, to adjust a length of the air gaps AG1-AG4. Of course, it is envisaged that the set of pole pieces 11 can also rotate around the center point CP to adjust the width of the air gaps AG1-AG4 (i.e. in a direction in-and-out of the page).

Once the set of pole pieces 11 is in the desired position, screws 10 may be tightened to fix the set of pole pieces 11 in position. Of course, the screws 10 may be loosened to allow the set of pole pieces 11 to be re-positioned at a later stage for further calibration. Alternatively, once the screws 10 are fixed, they may be permanently secured so that no further adjustments can take place. For example, the screws 10 may be permanently glued in place. Of course, other securement methods are envisaged to secure the screws 10 in place.

Figure 7:
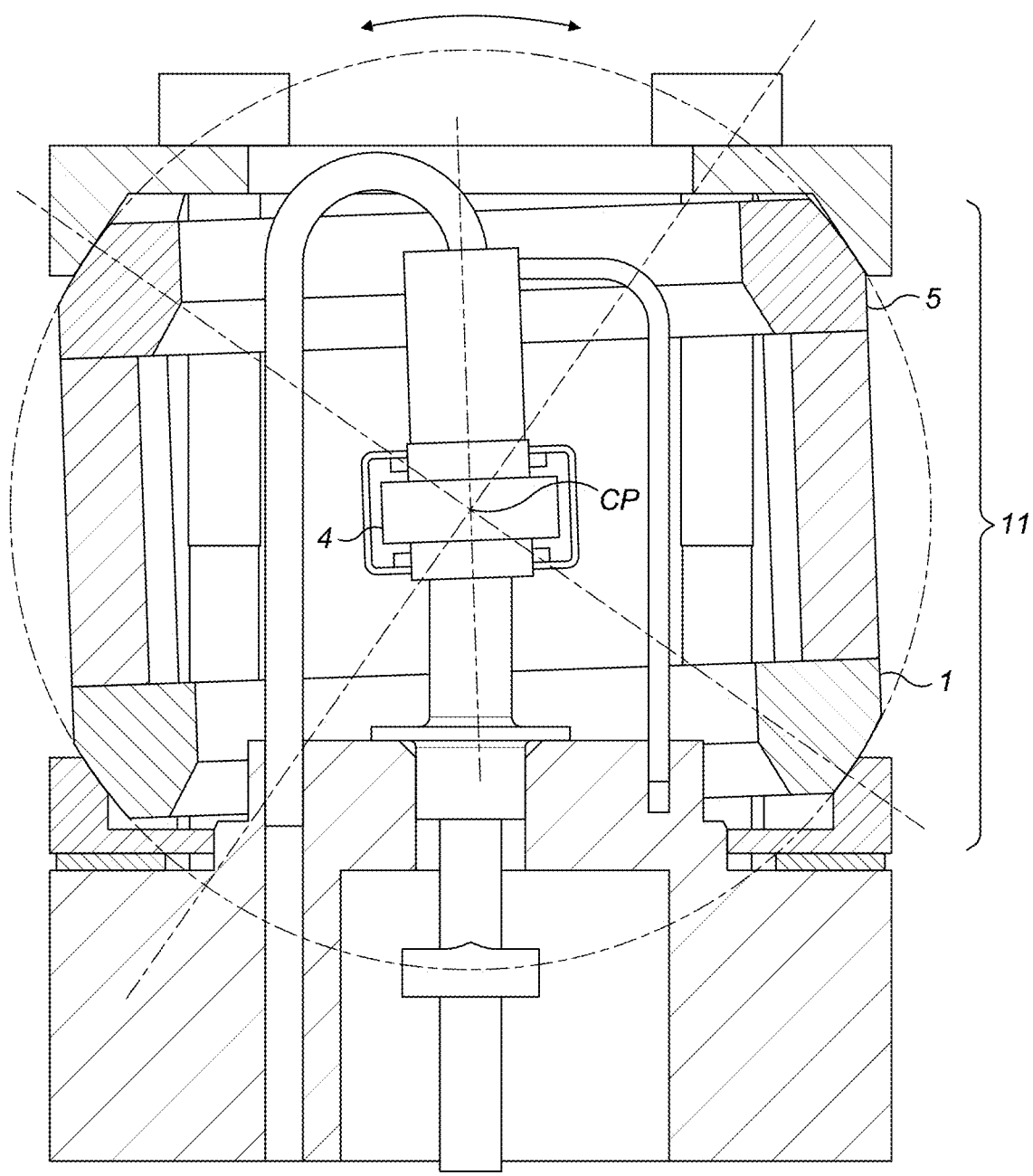
FIG. 7 shows a cross section of the assembled torque motor of FIG. 1 with calibrated pole pieces.

FIG. 7 shows a cross section of the torque motor with an alternative view. The end of the armature 4 is seen in this Figure. The set of pole pieces 11 includes the first pole piece 1 and second pole piece 5. As can be seen in this Figure, the set of pole pieces 11 can be rotated around the center point CP to calibrate the torque motor. From FIG. 7, it can be seen that the set of pole pieces 11 can rotate in a direction around the width of the armature 4, which in turn would adjust the width of the air gaps (not shown).

Although the invention has been described in terms of examples as set forth above, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A torque motor for a servovalve, said torque motor comprising:
   a set of pole pieces comprising a first pole piece and a second pole piece;
   an armature provided between the first pole piece and the second pole piece, said armature configured to provide air gaps (AG1-AG4) between the armature and the first pole piece, and the armature and the second pole piece;
   wherein the armature is configured to rotate about a center point (CP);
   wherein the set of pole pieces is adapted to rotate around the center point (CP) such that the air gaps (AG1-AG4) can be adjusted; and
   a first supporting part having a socket for receiving the first pole piece and a second supporting part having a socket for receiving the second pole piece.

2. The torque motor of claim 1, wherein the air gaps (AG1-AG4) have a length and a width, and wherein the set of pole pieces is adapted to rotate around the center point (CP) such that the length and/or the width of the air gaps (AG1-AG4) can be adjusted.

3. The torque motor of claim 1, wherein the first and second pole pieces each have a C-shaped cross section, and
   wherein the first and second pole pieces each have a ring shaped section extending in a plane and a first portion extending in a direction perpendicularly away from the plane of the ring shaped section, and
   wherein the first and second pole pieces each have a tapered ring section that tapers from the ring shaped section to an outer surface.

4. The torque motor of claim 3, wherein the outer surface is spherical.

5. The torque motor of claim 1, wherein the socket of the first supporting part includes a chamfered portion which is angled to receive the tapered portion of the first pole piece,
   wherein the second supporting part includes a chamfered portion which is angled to receive the tapered portion of the second pole piece, and
   wherein the chamfered portions are spherical.

6. The torque motor of claim 1, wherein a shim is provided between the socket of the first supporting part and the first supporting part to adjust the set of pole pieces in a vertical direction relative to the armature.

7. The torque motor of claim 1, further comprising screws to maintain the position of the set of pole pieces relative to the armature.

8. A method of adjusting air gaps (AG1-AG4) in a torque motor, said method comprising:
   providing a set of pole pieces having a first pole piece and a second pole piece;
   providing an armature between the first pole piece and the second pole piece, wherein air gaps (AG1-AG4) are provided between the armature and the first pole piece, and the armature and the second pole piece;
   adjusting the air gaps (AG1-AG4) by rotating the set of pole pieces relative to the armature about a center of rotation of the armature; and
   providing a first supporting part having a socket for receiving the first pole piece and a second supporting part having a socket for receiving the second pole piece.

9. The method of claim 8, further comprising adjusting a width and/or a length of the air gaps (AG1-AG4).

10. The method of claim 8, wherein the first and second pole pieces each have a C-shaped cross section, and wherein the first and second pole pieces each have a ring shaped section extending in a plane and a first portion extending in a direction perpendicularly away from the plane of the ring shaped section, and the first and second pole pieces each have a tapered ring section that tapers from the ring shaped section to an outer surface.

11. The method of claim 10, wherein the outer surface is spherical.

12. The method of claim 8, wherein the socket of the first supporting part includes a chamfered portion which is angled to receive the tapered portion of the first pole piece, and wherein the second supporting part includes a chamfered portion which is angled to receive the tapered portion of the second pole piece, wherein the chamfered portions are spherical.

13. The method of claim 12, further comprising providing a shim between the socket of the first supporting part and the first supporting part to adjust the set of pole pieces in a vertical direction relative to the armature.

14. The method of claim 13, said method further comprising fixing the position of the set of pole pieces relative to the armature.

* * * * *